US009306770B2

(12) United States Patent
Aguilar et al.

(10) Patent No.: US 9,306,770 B2
(45) Date of Patent: Apr. 5, 2016

(54) SYSTEMS AND METHODS FOR EXTENDING AN EXISTING NETWORK

(71) Applicant: Mastercard International Incorporated, Purchase, NY (US)

(72) Inventors: Edgar Aguilar, Chesterfield, MO (US); Curtis S. Ruhlman, Chesterfield, MO (US); Kevin S. Carney, St. Peters, MO (US); Hasan A. Alhalwachi, Dubai (AE)

(73) Assignee: MasterCard International Incorporated, Purchase, NY (US)

( * ) Notice: Subject to any disclaimer, the term of this patent is extended or adjusted under 35 U.S.C. 154(b) by 237 days.

(21) Appl. No.: 13/723,832

(22) Filed: Dec. 21, 2012

(65) Prior Publication Data

US 2013/0166440 A1 Jun. 27, 2013

Related U.S. Application Data

(60) Provisional application No. 61/579,803, filed on Dec. 23, 2011.

(51) Int. Cl.
*G06Q 20/10* (2012.01)
*G06Q 40/00* (2012.01)
*H04L 12/54* (2013.01)
*G06Q 20/16* (2012.01)
*G06Q 20/02* (2012.01)

(52) U.S. Cl.
CPC .......... *H04L 12/5601* (2013.01); *G06Q 20/027* (2013.01); *G06Q 20/16* (2013.01); *H04L 12/54* (2013.01)

(58) Field of Classification Search
CPC .................. G06Q 20/10; G06Q 20/40
USPC ........................................... 705/39
See application file for complete search history.

(56) References Cited

U.S. PATENT DOCUMENTS

| 6,226,260 | B1 | 5/2001 | McDysan |
| 6,584,083 | B1 | 6/2003 | Toporek et al. |
| 7,024,399 | B2 | 4/2006 | Sumner, II et al. |
| 7,096,281 | B2 | 8/2006 | Brabson |
| 7,239,620 | B2 | 7/2007 | Storm |
| 7,346,076 | B1 | 3/2008 | Habiby |
| 7,552,192 | B2 | 6/2009 | Carmichael |
| 7,716,312 | B2 | 5/2010 | Gamble |
| 7,881,737 | B2 | 2/2011 | Klein |
| 8,600,881 | B2 * | 12/2013 | Nguyen et al. ............ 705/39 |

(Continued)

OTHER PUBLICATIONS

PCT Search Report and Written Opinion dated Mar. 8, 2013 and Mar. 11, 2013 for Application No. PCT/US2012/071293 (9 Pages).

(Continued)

*Primary Examiner* — Jagdish Patel
(74) *Attorney, Agent, or Firm* — Armstrong Teasdale LLP

(57) ABSTRACT

A computer-implemented method for extending a payment network via a rapidly deployable telecommunications (RDT) network is provided. The method is implemented using a computer device coupled to a memory device. The method includes pre-assembling a network kit including a plurality of networking components for deploying at least a portion of an RDT network, determining a storage location for the network kit, determining a stock count of network kits, storing a number of network kits in the storage location equal to the stock count, and processing a request for one of the network kits stored within the storage location.

8 Claims, 14 Drawing Sheets

(56) References Cited

U.S. PATENT DOCUMENTS

| | | |
|---|---|---|
| 2004/0122888 A1 | 6/2004 | Carmichael |
| 2005/0213599 A1 | 9/2005 | Clawson |
| 2008/0049783 A1 | 2/2008 | Habiby et al. |
| 2008/0144659 A1 | 6/2008 | Habiby et al. |
| 2008/0267187 A1 | 10/2008 | Kulmala et al. |
| 2009/0063334 A1* | 3/2009 | Duncan ............ 705/39 |
| 2009/0112660 A1 | 4/2009 | Mullen et al. |
| 2009/0147690 A1 | 6/2009 | King |
| 2009/0171999 A1 | 7/2009 | McColl et al. |
| 2009/0254463 A1 | 10/2009 | Tomchek et al. |
| 2010/0014441 A1 | 1/2010 | Middleton-Hand et al. |
| 2010/0121701 A1 | 5/2010 | Nguyen et al. |
| 2010/0228683 A1 | 9/2010 | Ansley et al. |
| 2010/0235275 A1 | 9/2010 | Ansley |
| 2010/0254265 A1 | 10/2010 | Kempe |
| 2011/0060846 A1 | 3/2011 | Waldrop et al. |

OTHER PUBLICATIONS

PCT Search Report and Written Opinion dated Feb. 22, 2013 for Application No. PCT/US2012/071349 (10 Pages).

* cited by examiner

SYSTEMS AND METHODS FOR EXTENDING AN EXISTING NETWORK

CROSS-REFERENCE TO RELATED APPLICATIONS

This application claims the priority of U.S. Provisional Patent Application Ser. No. 61/579,803, filed Dec. 23, 2011, which is incorporated herein by reference.

BACKGROUND OF THE INVENTION

The field of the invention relates generally to methods and systems for extending an existing network and, more particularly, to methods and systems for extending a payment card network using a satellite-based communication link.

Known payment card interchange networks rely primarily on terrestrial network segments to pass data between network endpoints. For example, a known network may include copper wire lines, fiber optic lines, microwave relays, and the like. Such physical infrastructures are susceptible to installation delays and network failures, especially in areas or regions where such physical infrastructure is lacking. Accordingly, systems and methods are desired which enable terrestrial networks to be extended quickly and to be made more reliable via a non-terrestrial-based backup network. These systems and methods need to be quickly and strategically deployed, such that customers can be quickly added to the payment card networks.

BRIEF DESCRIPTION OF THE INVENTION

In one aspect a method and a system for extending a network are provided. The method includes determining, using a computer system, a storage location and a number of customer network units to be stored in the storage location. When a request for a customer network unit is received, the computer system processes the request and transmits a request for deployment of the customer network unit. The customer network unit is installed on a customer premises and facilitates network communication via satellite.

In another aspect, a computer-implemented method for extending a payment network via a rapidly deployable telecommunications (RDT) network is provided. The method is implemented using a computer device coupled to a memory device. The method includes pre-assembling a network kit including a plurality of networking components for deploying at least a portion of an RDT network, determining a storage location for the network kit, determining a stock count of network kits, storing a number of network kits in the storage location equal to the stock count, and processing a request for one of the network kits stored within the storage location.

In another aspect, a computer-readable storage media having computer-executable instructions embodied thereon is provided. When executed by at least one processor associated with a computer device coupled to a memory device, the computer-executable instructions cause the processor to prompt a user to pre-assemble a network kit including a plurality of networking components for deploying at least a portion of an RDT network, determine a storage location for the network kit, determine a stock count of network kits, recommend storing a number of network kits in the storage location equal to the stock count, and process a request for one of the network kits stored within the storage location.

In another aspect, a computer system for extending a payment network via a rapidly deployable telecommunications (RDT) network is provided. The computer system includes a computing device including a processor, and a computer-readable storage device having encoded thereon computer-executable instructions that are executable by the processor. When executed by the processor, the instructions cause the processor to perform the following functions including prompting a user to pre-assemble a network kit including a plurality of networking components for deploying at least a portion of an RDT network, determining a storage location for the network kit, determining a stock count of network kits, recommending storing a number of network kits in the storage location equal to the stock count, and processing a request for one of the network kits stored within the storage location.

BRIEF DESCRIPTION OF THE DRAWINGS

FIG. 1 is a schematic diagram illustrating an example multi-party payment card industry system for enabling ordinary payment-by-card transactions in which merchants and card issuers do not necessarily have a one-to-one relationship.

FIG. 2 is a simplified block diagram of an example system including a plurality of computer devices in accordance with one example embodiment of the present invention.

FIG. 3 is an expanded block diagram of an example embodiment of a server architecture of the system including the plurality of computer devices in accordance with one example embodiment of the present invention.

FIG. 4 illustrates an example configuration of a client system shown in FIGS. 2 and 3.

FIG. 5 illustrates an example configuration of a server system shown in FIGS. 2 and 3.

FIG. 6 is a schematic diagram of an example communication network that includes a rapidly deployable telecommunication (RDT) network that may be used with the multi-party transaction card industry system shown in FIG. 1.

FIGS. 7 and 8 are schematic diagrams of an example customer/RDT network that may be used with the network shown in FIG. 6.

FIGS. 9 and 10 are schematic diagrams of an example NNI that may be used with the network shown in FIG. 6.

FIG. 11 is a schematic diagram of an example configuration of the network shown in FIG. 6.

FIG. 12 is an alternative schematic diagram of the example NNI that may be used with the network shown in FIG. 6.

FIG. 13 is a flow diagram of an example method for deploying a communication network that includes an RDT network as shown in FIG. 6.

FIG. 14 is a flow diagram of an example method for deploying customer/RDT networks as described in FIG. 13 and shown in FIG. 6.

DETAILED DESCRIPTION OF THE INVENTION

Figure 1:
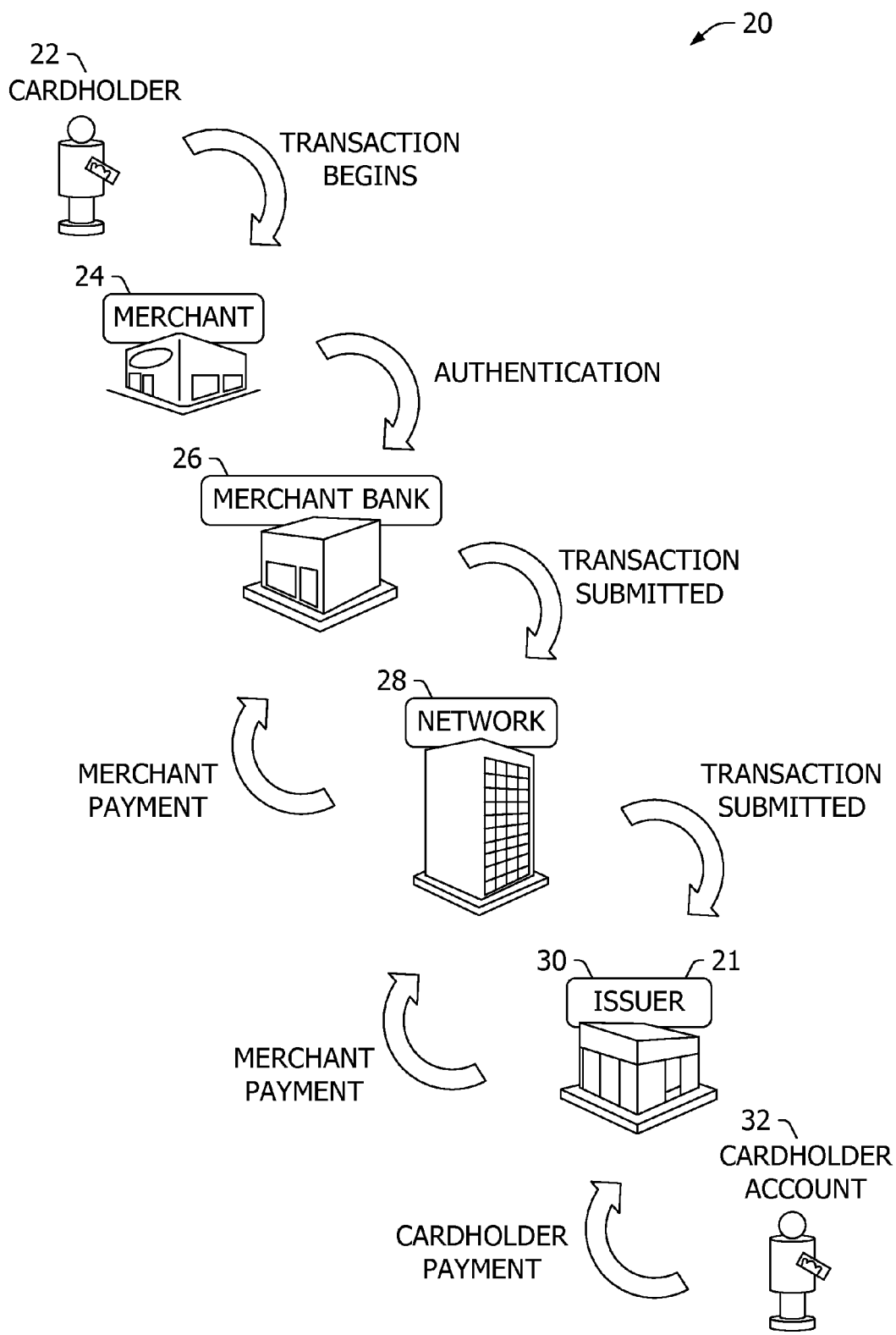
FIGS. 1-14 show exemplary embodiments of the methods and systems described herein.

Embodiments of the present invention provide methods and systems for extending an existing network. Existing payment card networks, such as, for example, an interchange network, rely primarily on terrestrial networks to connect network endpoints. A system for extending such existing networks using a satellite network is described herein. The satellite network may be used as a primary link or as a secondary, or backup, link. As described in more detail herein, a system and method is provided for using a satellite link as a primary link until a new terrestrial network segment can be established, at which time the satellite link may become a backup link to the terrestrial circuit.

The use of payment cards by consumers or cardholders in performing financial transactions is growing throughout the world. As the use of these payment cards move into new markets and expand in acceptance in existing markets, the importance of the reliability and rapid deployment of network connectivity solutions becomes of strategic business importance. For example, in new and emerging markets, such as Eastern Europe, the Middle East, and Africa, traditional connectivity solutions and the speed with which they can be deployed are not meeting customer and regional business needs and expectations.

For example, in the past, there have been two important timelines that make up the delivery of customer connectivity to a payment network using a terrestrial network, namely (i) network equipment delivery, and (ii) telecommunication circuit provisioning. These timelines run in parallel and, depending on the location of the customer, the telecommunications circuit (i.e., terrestrial network) provisioning timeline may be significantly longer than that of the network equipment delivery timeline.

A customer of a payment network, such as the MasterCard® payment network, typically includes an issuer bank (i.e., a bank that issues a payment card) and/or an acquirer bank (i.e., the bank where the merchant has an account). In the past, the customer location (either the issuer bank or the acquirer bank) is typically connected to the payment network by a telecommunications circuit associated with a global telecommunication service provider (e.g., AT&T, British Telecom, etc.) from a local telecommunications service provider (frequently referred to as a PTT). In many of the emerging market countries, the time from ordering the telecommunications circuit to the actual installation or provisioning of the circuit takes between 90 and 180 days. The number of days can vary depending on several variables included in the service provider infrastructure and customer facility. Each customer location also requires network and processing devices which are connected to the telecommunications circuit. The time from ordering the equipment to actual installation takes between 45 and 90 days. Accordingly, in many locations throughout the world, it may take 180 days to connect a customer to a payment network using the traditional process of connecting the customer through a terrestrial telecommunication network.

The systems and methods described herein, which are sometimes referred to herein as a "rapidly deployable telecommunications network" or "RDT network", are directed at solving this terrestrial network connectivity problem. The RDT network, as described herein, enable payment networks, such as an interchange network, to accelerate the deployment of network infrastructure and connectivity solutions to meet the business and competitive requirements in emerging or growing markets.

The RDT network is configured to improve the timeline needed for ordering and installing the telecommunication network. The RDT network achieves these goals by: (i) collecting customer (e.g., either an issuer bank, an acquirer bank or both) information including information relating to the customer's facilities, and network infrastructure prior to the completion of a new franchise agreement; (ii) initiating a satellite licensing process for each satellite connection planned for connecting the customer to the payment network; (iii) pre-bundling of network and satellite devices into RDT network kits, and pre-storing the RDT network kits in warehouses in strategic locations so that the kits are ready for immediate deployment to connect the customer to the payment network; and (iv) once the satellite license is granted, the new customer is connected to the payment network through the satellite circuit as their primary circuit until a standard terrestrial circuit is in place. Thus, as discussed below in more detail, the RDT network includes (1) the satellite communication link for connecting to the payment network, and (2) the standard terrestrial circuit that is subsequently configured to connect the customer to the payment network. The RDT network kits include (1) the components needed to configure the satellite communication link, and (2) the components needed to connect the customer to the standard terrestrial circuit once it is installed.

In the example embodiment, the RDT network kits may include at least one of the following items: (1) Payment Network Interface Processor Equipment: server cabinet, 2 interface processor servers, 1 monitor kit, 1 KVM switch, CDs, cables and power cords; (2) Communication Equipment: 2 network routers, 2 network switches, cables and power cords; (3) VSAT Equipment: C-Band configuration: antenna, mount, block upconverter, low noise block converter, TDMA modem, installation kit, uninterruptable power supply and battery pack; (4) VSAT Spare Equipment: TDMA modem, block upconverter, low noise block converter; and (5) Links: MPLS link (terrestrial), and VSAT link (satellite).

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, and/or computers. Each type of transactions card can be used as a method of payment for performing a transaction. In addition, consumer card account behavior can include but is not limited to purchases, management activities (e.g. balance checking), bill payments, achievement of targets (meeting account balance goals, paying bills on time), and/or product registrations (e.g. mobile application downloads).

In one embodiment, a computer program is provided, and the program is embodied on a computer readable medium. In an exemplary embodiment, the system is executed on a single computer system, without requiring a connection to a sever computer. In a further exemplary embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the invention by way of example and not by way of limitation. It is contemplated that the invention has general application to processing financial transaction data by a third party in industrial, commercial, and residential applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present invention are not intended to be interpreted as excluding the existence of additional embodiments that also incorporate the recited features.

FIG. 1 is a schematic diagram illustrating an example multi-party transaction card industry system 20 for enabling ordinary payment-by-card transactions in which merchants 24 and card issuers 30 do not need to have a one-to-one special relationship. Embodiments described herein may relate to a transaction card system, such as a credit card payment system using the MasterCard® interchange network. The MasterCard® interchange network is a set of proprietary communications standards promulgated by MasterCard International Incorporated® for the exchange of financial transaction data and the settlement of funds between financial institutions that are members of MasterCard International Incorporated®. (MasterCard is a registered trademark of MasterCard International Incorporated located in Purchase, N.Y.).

In a typical transaction card system, a financial institution called the "issuer" issues a transaction card, such as a credit card, to a consumer or cardholder 22, who uses the transaction card to tender payment for a purchase from a merchant 24. To accept payment with the transaction card, merchant 24 must normally establish an account with a financial institution that is part of the financial payment system. This financial institution is usually called the "merchant bank," the "acquiring bank," or the "acquirer." When cardholder 22 tenders payment for a purchase with a transaction card, merchant 24 requests authorization from a merchant bank 26 for the amount of the purchase. The request may be performed over the telephone, but is usually performed through the use of a point-of-sale terminal, which reads cardholder's 22 account information from a magnetic stripe, a chip, or embossed characters on the transaction card and communicates electronically with the transaction processing computers of merchant bank 26. Alternatively, merchant bank 26 may authorize a third party to perform transaction processing on its behalf. In this case, the point-of-sale terminal will be configured to communicate with the third party. Such a third party is usually called a "merchant processor," an "acquiring processor," or a "third party processor."

Using an interchange network 28, computers of merchant bank 26 or merchant processor will communicate with computers of an issuer bank 30 to determine whether cardholder's 22 account 32 is in good standing and whether the purchase is covered by cardholder's 22 available credit line. Based on these determinations, the request for authorization will be declined or accepted. If the request is accepted, an authorization code is issued to merchant 24.

When a request for authorization is accepted, the available credit line of cardholder's 22 account 32 is decreased. Normally, a charge for a payment card transaction is not posted immediately to cardholder's 22 account 32 because bankcard associations, such as MasterCard International Incorporated®, have promulgated rules that do not allow merchant 24 to charge, or "capture," a transaction until goods are shipped or services are delivered. However, with respect to at least some debit card transactions, a charge may be posted at the time of the transaction. When merchant 24 ships or delivers the goods or services, merchant 24 captures the transaction by, for example, appropriate data entry procedures on the point-of-sale terminal This may include bundling of approved transactions daily for standard retail purchases. If cardholder 22 cancels a transaction before it is captured, a "void" is generated. If cardholder 22 returns goods after the transaction has been captured, a "credit" is generated. Interchange network 28 and/or issuer bank 30 stores the transaction card information, such as a type of merchant, amount of purchase, date of purchase, in a database 120 (shown in FIG. 2).

After a purchase has been made, a clearing process occurs to transfer additional transaction data related to the purchase among the parties to the transaction, such as merchant bank 26, interchange network 28, and issuer bank 30. More specifically, during and/or after the clearing process, additional data, such as a time of purchase, a merchant name, a type of merchant, purchase information, cardholder account information, a type of transaction, itinerary information, information regarding the purchased item and/or service, and/or other suitable information, is associated with a transaction and transmitted between parties to the transaction as transaction data, and may be stored by any of the parties to the transaction. In the exemplary embodiment, when cardholder 22 purchases travel, such as airfare, a hotel stay, and/or a rental car, at least partial itinerary information is transmitted during the clearance process as transaction data. When interchange network 28 receives the itinerary information, interchange network 28 routes the itinerary information to database 120.

After a transaction is authorized and cleared, the transaction is settled among merchant 24, merchant bank 26, and issuer bank 30. Settlement refers to the transfer of financial data or funds among merchant's 24 account, merchant bank 26, and issuer bank 30 related to the transaction. Usually, transactions are captured and accumulated into a "batch," which is settled as a group. More specifically, a transaction is typically settled between issuer bank 30 and interchange network 28, and then between interchange network 28 and merchant bank 26, and then between merchant bank 26 and merchant 24.

Figure 2:
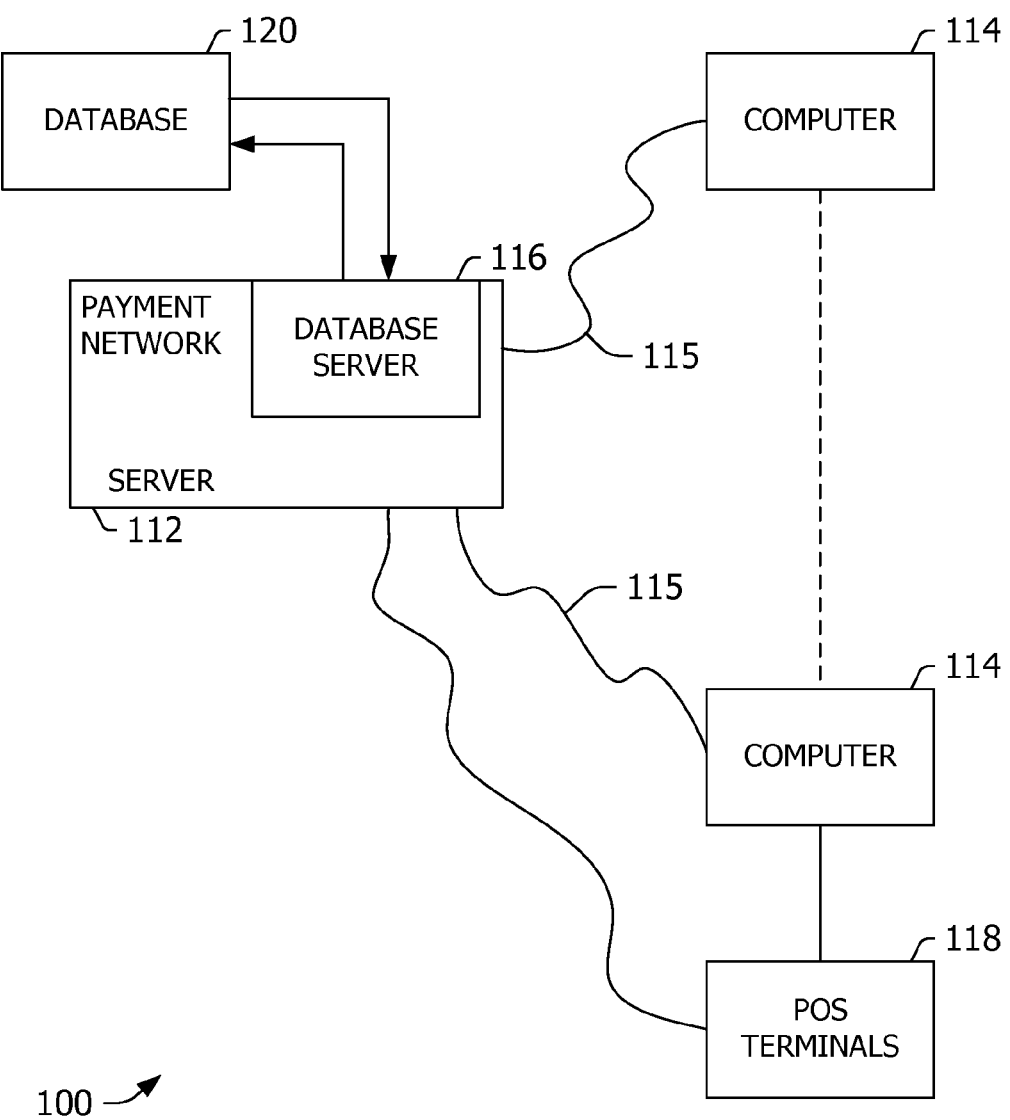

FIG. 2 is a simplified block diagram of an example payment processing system 100 including a plurality of computer devices connected in communication using a rapidly deployable telecommunications network ("RDT network") as described herein. In the example embodiment, system 100 may be used for performing payment-by-card transactions received as part of processing the financial transaction.

More specifically, in the example embodiment, system 100 includes a server system 112, and a plurality of client subsystems, also referred to as client systems 114, connected to server system 112. In one embodiment, client systems 114 are computers including a web browser, such that server system 112 is accessible to client systems 114 using the Internet. Client systems 114 are interconnected to the Internet through many interfaces including a network 115, such as a local area network (LAN) or a wide area network (WAN), dial-in-connections, cable modems, special high-speed Integrated Services Digital Network (ISDN) lines, and RDT networks. Client systems 114 could be any device capable of interconnecting to the Internet including a web-based phone, PDA, or other web-based connectable equipment.

System 100 also includes point-of-sale (POS) terminals 118, which may be connected to client systems 114 and may be connected to server system 112. POS terminals 118 are interconnected to the Internet through many interfaces including a network, such as a local area network (LAN) or a wide area network (WAN), dial-in-connections, cable modems, wireless modems, and special high-speed ISDN lines. POS terminals 118 could be any device capable of interconnecting to the Internet and including an input device capable of reading information from a consumer's financial transaction card.

A database server 116 is connected to database 120, which contains information on a variety of matters, as described below in greater detail. In one embodiment, centralized database 120 is stored on server system 112 and can be accessed by potential users at one of client systems 114 by logging onto server system 112 through one of client systems 114. In an alternative embodiment, database 120 is stored remotely from server system 112 and may be non-centralized.

Database 120 may include a single database having separated sections or partitions or may include multiple databases, each being separate from each other. Database 120 may store transaction data generated as part of sales activities conducted over the processing network including data relating to merchants, account holders or customers, issuers, acquirers, and/or purchases made. Database 120 may also store account data including at least one of a cardholder name, a cardholder address, an account number, and other account identifier. Database 120 may also store merchant data including a merchant identifier that identifies each merchant registered to use the network, and instructions for settling transactions including merchant bank account information. Database 120 may also store purchase data associated with items being purchased by a cardholder from a merchant, and authorization request data.

In the example embodiment, one of client systems 114 may be associated with acquirer bank 26 (shown in FIG. 1) while another one of client systems 114 may be associated with issuer bank 30 (shown in FIG. 1). POS terminal 118 may be associated with a participating merchant 24 (shown in FIG. 1) or may be a computer system and/or mobile system used by a cardholder making an on-line purchase or payment. Server system 112 may be associated with interchange network 28. In the exemplary embodiment, server system 112 is associated with a network interchange, such as interchange network 28, and may be referred to as an interchange computer system. Server system 112 may be used for processing transaction data. In addition, client systems 114 and/or POS terminal 118 may include a computer system associated with at least one of an online bank, a bill payment outsourcer, an acquirer bank, an acquirer processor, an issuer bank associated with a transaction card, an issuer processor, a remote payment system, and/or a biller.

In the example embodiment, network connection 115 may include the RDT network described herein. The RDT network allows the payment network associated with server system 112 to rapidly connect with acquirer bank 26 and/or issuer bank 30 (shown in FIG. 1) by initially deploying a satellite communication link between the payment network and acquirer bank 26 and/or issuer bank 30, and subsequently deploying a terrestrial communication link between the payment network and acquirer bank 26 and/or issuer bank 30. As described below, the pre-bundling of network and satellite devices into satellite network kits used to form RDT network 115, and pre-storing the satellite network kits in warehouses in strategic locations for immediate deployment enable the payment network to quickly bring acquirers and issuers online for processing of payment transactions.

Using the interchange network, the computers of the merchant bank or the merchant processor will communicate with the computers of the issuer bank to determine whether the consumer's account is in good standing and whether the purchase is covered by the consumer's available credit line. Based on these determinations, the request for authorization will be declined or accepted. If the request is accepted, an authorization code is issued to the merchant.

When a request for authorization is accepted, the available credit line of consumer's account is decreased. Normally, a charge is not posted immediately to a consumer's account because bankcard associations, such as MasterCard International Incorporated®, have promulgated rules that do not allow a merchant to charge, or "capture," a transaction until goods are shipped or services are delivered. When a merchant ships or delivers the goods or services, the merchant captures the transaction by, for example, appropriate data entry procedures on the point-of-sale terminal If a consumer cancels a transaction before it is captured, a "void" is generated. If a consumer returns goods after the transaction has been captured, a "credit" is generated.

For debit card transactions, when a request for a PIN authorization is approved by the issuer, the consumer's account is decreased. Normally, a charge is posted immediately to a consumer's account. The bankcard association then transmits the approval to the acquiring processor for distribution of goods/services, or information or cash in the case of an ATM.

After a transaction is captured, the transaction is settled between the merchant, the merchant bank, and the issuer. Settlement refers to the transfer of financial data or funds between the merchant's account, the merchant bank, and the issuer related to the transaction. Usually, transactions are captured and accumulated into a "batch," which is settled as a group.

Figure 3:
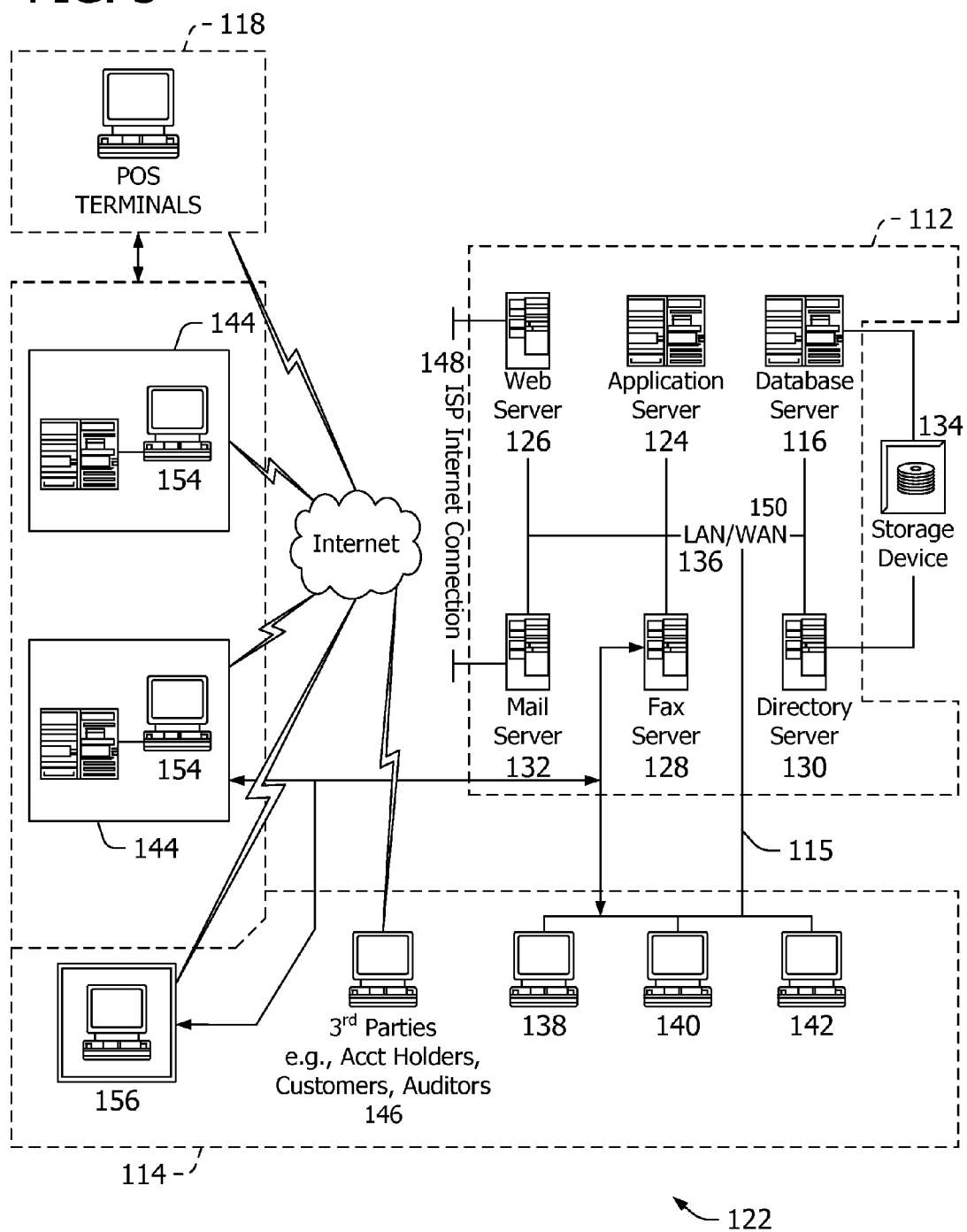

FIG. 3 is an expanded block diagram of an exemplary embodiment of a server architecture of a processing system 122 including other computer devices in accordance with one embodiment of the present invention. Components in system 122, identical to components of system 100 (shown in FIG. 2), are identified in FIG. 3 using the same reference numerals as used in FIG. 2. System 122 includes server system 112, client systems 114, and POS terminals 118. Server system 112 further includes database server 116, a transaction server 124, a web server 126, a fax server 128, a directory server 130, and a mail server 132. A storage device 134 is coupled to database server 116 and directory server 130. Servers 116, 124, 126, 128, 130, and 132 are coupled in a local area network (LAN) 136. In addition, an issuer bank workstation 138, an acquirer bank workstation 140, and a third party processor workstation 142 may be coupled to LAN 136. In the example embodiment, issuer bank workstation 138, acquirer bank workstation 140, and third party processor workstation 142 are coupled to LAN 136 using network connection 115. Network connection 115 includes the RDT network, which allows the payment network associated with server system 112 to rapidly connect with acquirer bank 26 and/or issuer bank 30 (shown in FIG. 1) by initially deploying a satellite communication link between the payment network and acquirer bank 26 and/or issuer bank 30, and subsequently deploying a terrestrial communication link between the payment network and acquirer bank 26 and/or issuer bank 30. Alternatively, workstations 138, 140, and 142 are coupled to LAN 136 using an Internet link or are connected through an Intranet.

Each workstation 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties, e.g., account holders, customers, auditors, developers, consumers, merchants, acquirers, issuers, etc., 146 using an ISP Internet connection 148. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150.

In the exemplary embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 156 using a telephone link. Fax server 128 is configured to communicate with other client systems 138, 140, and 142 as well.

Figure 4:
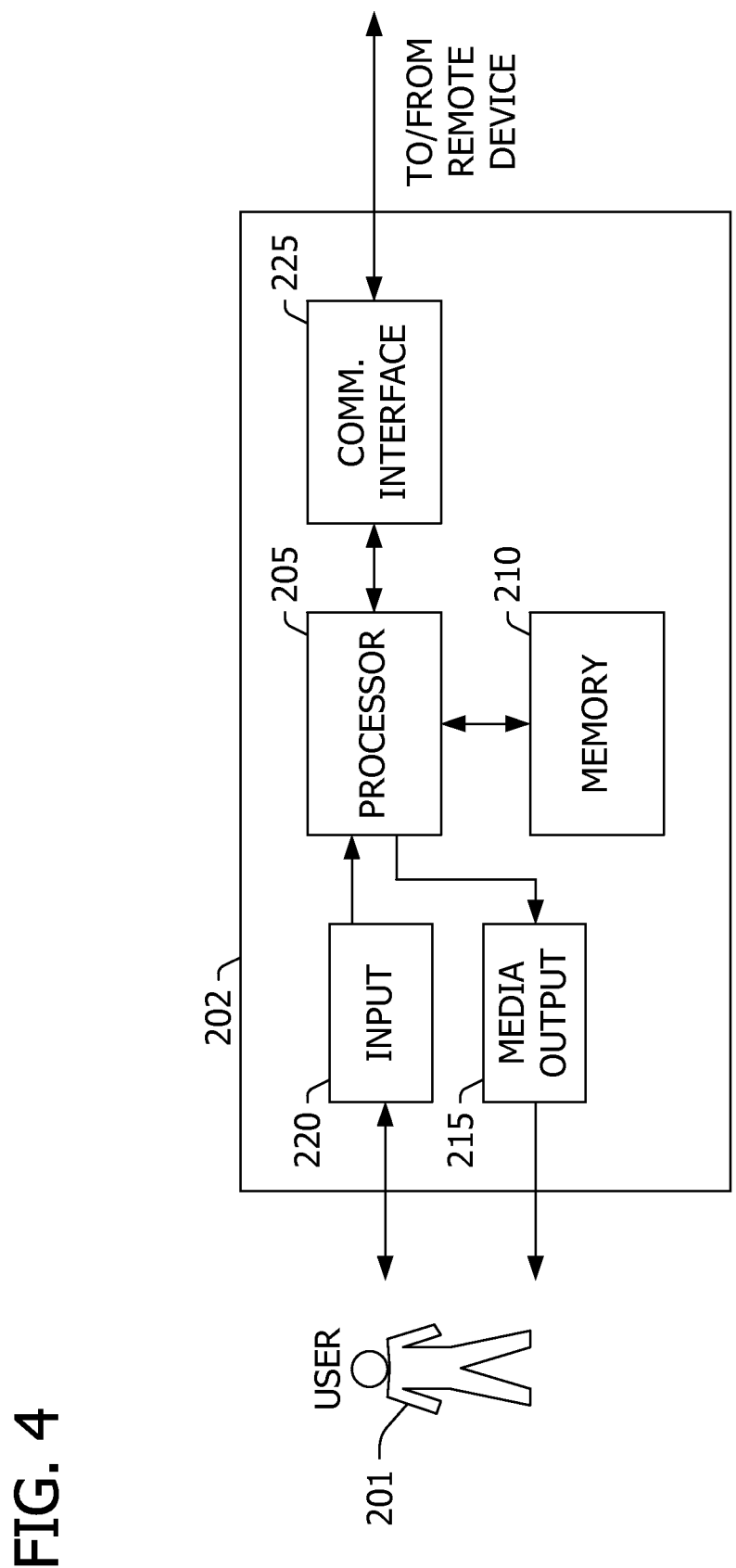

FIG. 4 illustrates an exemplary configuration of a user system 202 operated by a user 201, such as cardholder 22 (shown in FIG. 1). User system 202 may include, but is not limited to, client systems 114, 138, 140, and 142, POS terminal 118, workstation 154, and manager workstation 156. In the exemplary embodiment, user system 202 includes a processor 205 for executing instructions. In some embodiments, executable instructions are stored in a memory area 210. Processor 205 may include one or more processing units, for example, a multi-core configuration. Memory area 210 is any device allowing information such as executable instructions and/or written works to be stored and retrieved. Memory area 210 may include one or more computer readable media.

User system 202 also includes at least one media output component 215 for presenting information to user 201. Media output component 215 is any component capable of conveying information to user 201. In some embodiments, media output component 215 includes an output adapter such as a video adapter and/or an audio adapter. An output adapter is operatively coupled to processor 205 and operatively couplable to an output device such as a display device, a liquid crystal display (LCD), organic light emitting diode (OLED) display, or "electronic ink" display, or an audio output device, a speaker or headphones.

In some embodiments, user system 202 includes an input device 220 for receiving input from user 201. Input device 220 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 215 and input device 220. User system 202 may also include a communication interface 225, which is communicatively couplable to a remote device such as server system 112. Communication interface 225 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web page or a website from server system 112. A client application allows user 201 to interact with a server application from server system 112.

Figure 5:
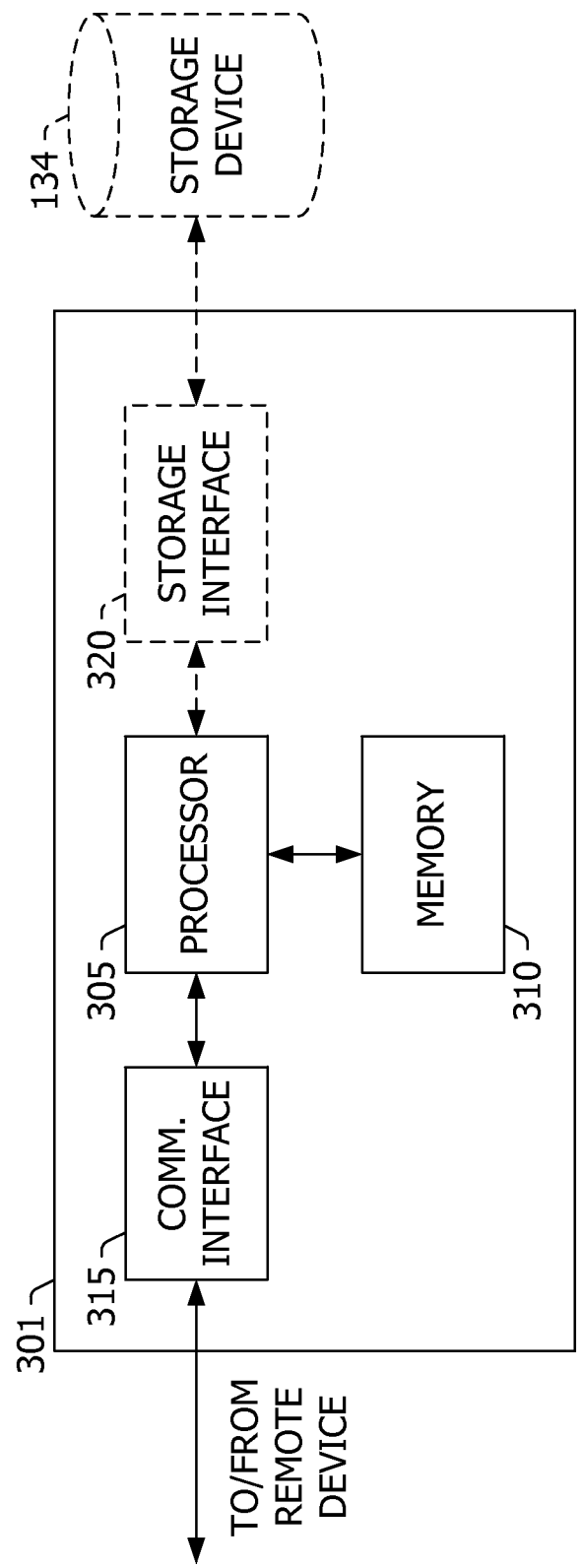

FIG. 5 illustrates an exemplary configuration of a server system 301 such as server system 112 (shown in FIGS. 2 and 3). Server system 301 may include, but is not limited to, database server 116, transaction server 124, web server 126, fax server 128, directory server 130, and mail server 132.

Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 305 is operatively coupled to a communication interface 315 such that server system 301 is capable of communicating with a remote device such as a user system or another server system 301. For example, communication interface 315 may receive requests from user system 114 via the Internet, as illustrated in FIGS. 2 and 3.

Processor 305 may also be operatively coupled to a storage device 134. Storage device 134 is any computer-operated hardware suitable for storing and/or retrieving data. In some embodiments, storage device 134 is integrated in server system 301. For example, server system 301 may include one or more hard disk drives as storage device 134. In other embodiments, storage device 134 is external to server system 301 and may be accessed by a plurality of server systems 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory area 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 6:
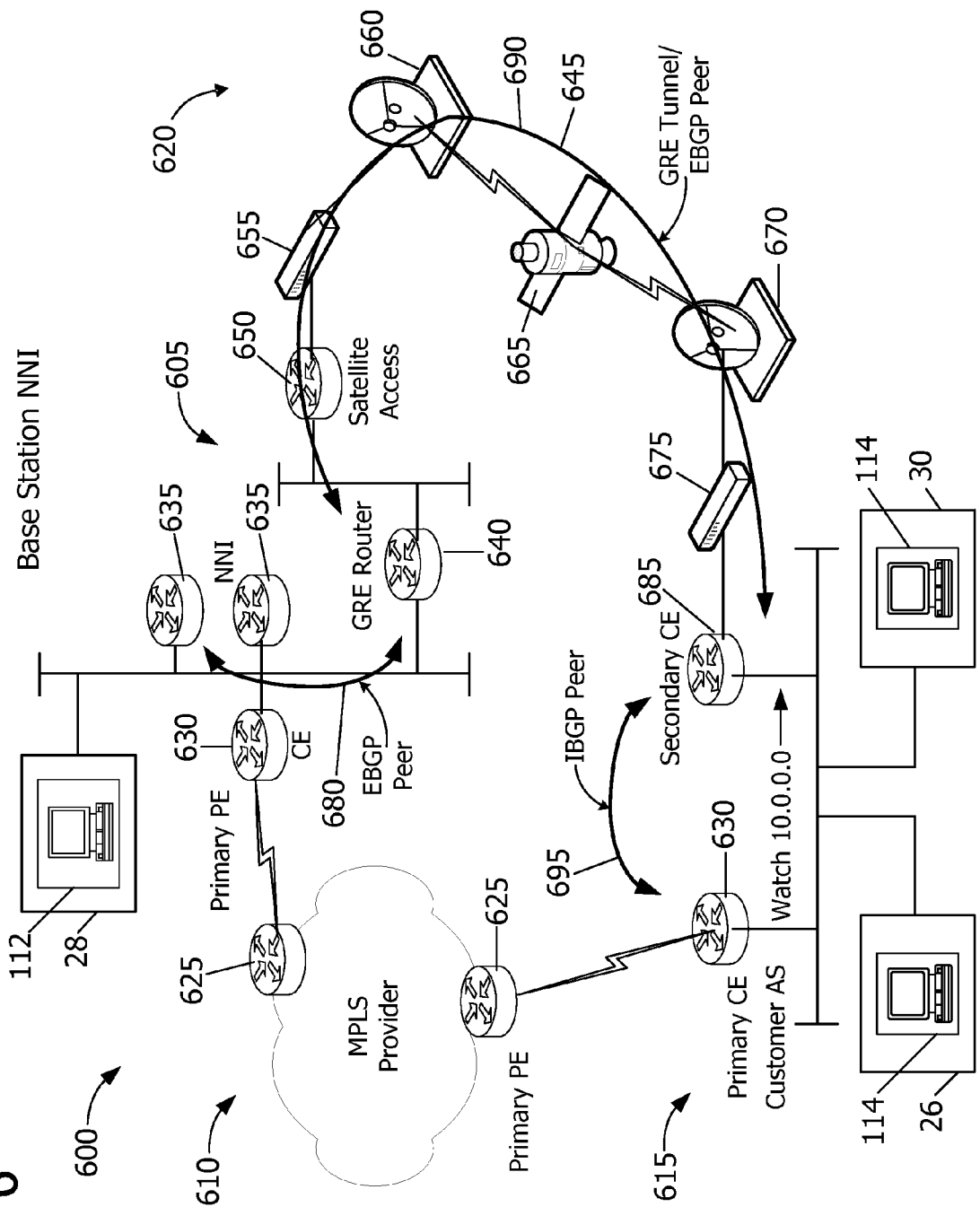

FIG. 6 is a schematic diagram of a communication network 600 that may be used with multi-party transaction card industry system 20 (shown in FIG. 1) or interchange network 28. Network 600 is similar to network connection 115 described herein and shown in FIG. 2. More specifically, communication network 600 includes a network to network interface (NNI) 605, one or more multiprotocol label switching (MPLS) networks 610, a customer network 615, and a satellite network 620. In the example embodiment, customer network 615 is also referred to as a "rapidly deployable telecommunications network" or RDT network. RDT network 615 is part of network connection 115 shown in FIG. 2.

RDT network 615 is configured to be quickly deployed and provide at least a portion of the overall communication network 600 between server system 112 of payment network 28, and acquirer bank 26 and/or issuer bank 30 for processing payment transactions. RDT network 615 allows payment network 28 to rapidly connect with acquirer bank 26 and/or issuer bank 30 (shown in FIG. 1) by initially deploying a satellite communication link between the payment network and acquirer bank 26 and/or issuer bank 30, and subsequently deploying a terrestrial communication link between the payment network and acquirer bank 26 and/or issuer bank 30.

In the exemplary embodiment, communication network 600 includes a network to network interface (NNI) 605, one or more multiprotocol label switching (MPLS) networks 610, a customer/RDT network 615, and a satellite network 620. It should be appreciated that NNI 605 may link customer network/RDT network 615 with satellite network 620 and/or MPLS network 610. In the exemplary embodiment, satellite network 620 is used when MPLS network 610 is unavailable. For example, satellite network 620 may be used before RDT network 615 is connected to MPLS network 610. Alternatively, or additionally, satellite network 620 may be used as a secondary, or backup, link if RDT network 615 is unable to reach NNI 605 via MPLS network 610. Satellite network 620 may also be used as a primary link between RDT network 615 and NNI 605.

MPLS network 610 includes at least one provider edge (PE) router 625 that is connected to a corresponding customer edge (CE) router 630. NNI 605 may be linked to more than one MPLS network 610 and NNI 605 may be configured to route data traffic between or among the more than one MPLS network 610. More particularly, NNI 605 may include at least one CE router 630 for each connected MPLS network 610. NNI 605 may include at least one router 635 configured to forward data traffic from a first MPLS network, such as MPLS network 610, to a second MPLS network (not shown) via the corresponding CE router(s) 630. Alternatively, CE router 630 may be configured to forward traffic bound for a different MPLS network 610 to the corresponding CE router 630.

NNI 605 is linked to satellite network 620 via a router 640 that is capable of creating a GRE tunnel, such as GRE tunnel 645. Satellite network 620 may include a satellite network provider system 650, which may be a router, a first satellite modem 655, a first satellite dish 660 or transceiver, a satellite 665, a second satellite dish 670 or transceiver, and a second satellite modem 675. Alternatively, router 640 and system 650 may be a single device. When used as a primary link, satellite network 620 may provide a contention ratio of 1:1 for RDT network 615. When used as a secondary link, satellite network 620 may provide a higher contention ratio, e.g. 1:5, 1:10, 1:20, 1:50, etc., for RDT network 615.

GRE tunnel 645 is used to connect RDT network 615 with NNI 605. In the exemplary embodiment, GRE tunnel 645 is created using satellite network 620. Alternatively, or additionally, GRE tunnel 645 may be created using any other network, such as the Internet. Border gateway protocol (BGP) may be used across GRE tunnel 645 for routing. BGP conditional advertising may be used to introduce RDT network 615 if the primary link, i.e., MPLS network 610, is unusable. A BGP community string may be used to identify the networks passed over the secondary link, i.e., satellite network 620 or the Internet. A BGP autonomous system (AS) number may be prepended for identifying the secondary link as a learned route. Static routing may be used to connect NNI 605 with router 640 and/or satellite network 620. Satellite network 620 may provide a tunnel destination route, e.g., following RFC1918. In the exemplary embodiment, router 640 is capable of supporting policy maps, class maps, prefix lists, and an access control list (ACL) specific to satellite network 620.

External BGP (EBGP) peers 680 may be established between router 640 and router(s) 635 for passing RDT network 615 as a secondary, or backup, connection. NNI 605 may advertise RDT network 615 using BGP. To allow for a redundant path, BGP conditional advertisement may be used. A BGP peer route-map entry may be used to filter traffic such that only predetermined traffic is sent to GRE router 640. A BGP peer "distribute-list" may be used to limit the learned routes from GRE router 640. The distribute-list may deny all routes from GRE router 640. It should be appreciated that BGP timers may need to be set sufficiently high to allow for transmission delays associated with transmission via satellite network 620, e.g. several hundred milliseconds.

GRE tunnel 645 may connect to CE router 630 on RDT network 615 or a second CE router 685 on RDT network 615. EBGP peers 690 may be established at endpoints of GRE tunnel 645, e.g., router 640 and router 685, or router 640 and router 630 on RDT network 615. Using BGP conditional advertising, RDT network 615 may be advertised over GRE tunnel 645. A watched router for BGP conditional advertising may be in the 10.0.0.0/8 network. In the exemplary embodiment, GRE tunnel 645 endpoint on RDT network 615, e.g. router 630 or router 685, is capable of supporting route maps, policy maps, class maps, prefix lists, and an ACL. Accordingly, quality of service (QoS) may be enforced over GRE tunnel 645. In RDT networks 615 with second router 685, an internal BGP (IBGP) peer session 695 may be established between router 630 on RDT network 615 and router 685 in order to pass the 10.0.0.0/8 watched network. A static route may be used for egress access that points to GRE tunnel 645. GRE keepalives may be used on GRE tunnel 645.

During operation, if a primary link, e.g., a link from RDT network 615 to MPLS network 610, were to fail, data (e.g., application traffic) normally transmitted over router 630 will instead be transmitted via router 685. Data transmitted to router 685 will be encapsulated in GRE tunnel 645 between RDT network 615 and NNI 605. In the exemplary embodiment, satellite modem 675 encrypts incoming data, i.e., GRE tunnel 645. Data in GRE tunnel 645 is transmitted via satellite dish 670 to satellite 665 for forwarding to satellite modem 655 via satellite dish 660. GRE tunnel 645 is decrypted, e.g., using modem 655 or system 650, before it is passed to router 640. Router 640 de-encapsulates GRE tunnel 645 and forwards the data from GRE tunnel 645 to router(s) 635 for forwarding to appropriate destinations, e.g., using MPLS network 610. On router 685, a statically-assigned default route, i.e., 0.0.0.0/0, may point to the IP address of GRE tunnel 645 at NNI 605. More particularly, when the link to MPLS network 610 fails, BGP will no longer see the watched 10.0.0.0 network and will trigger BGP to forward RDT network 615 traffic to router 685. Router 685 may also forward the advertised RDT network 615 to NNI 605 for forwarding, e.g., to CE router 630 within NNI 605. More particularly, RDT network 615, GRE tunnel 645 interfaces, and router loopback addresses may be advertised. It should be appreciated that RDT network 615 routes may be advertised only when the link between RDT network 615 and MPLS network 610 fails.

Figure 7:
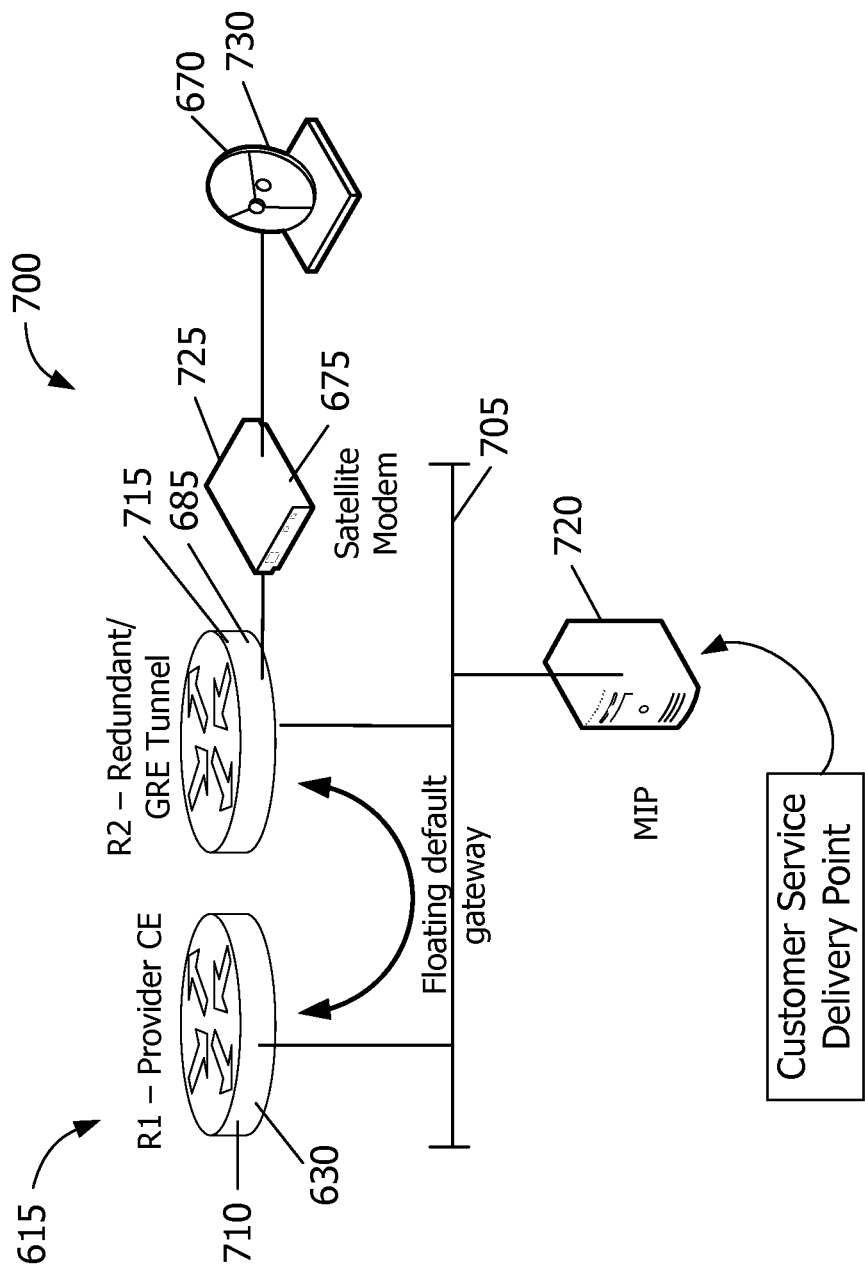
Figure 8:
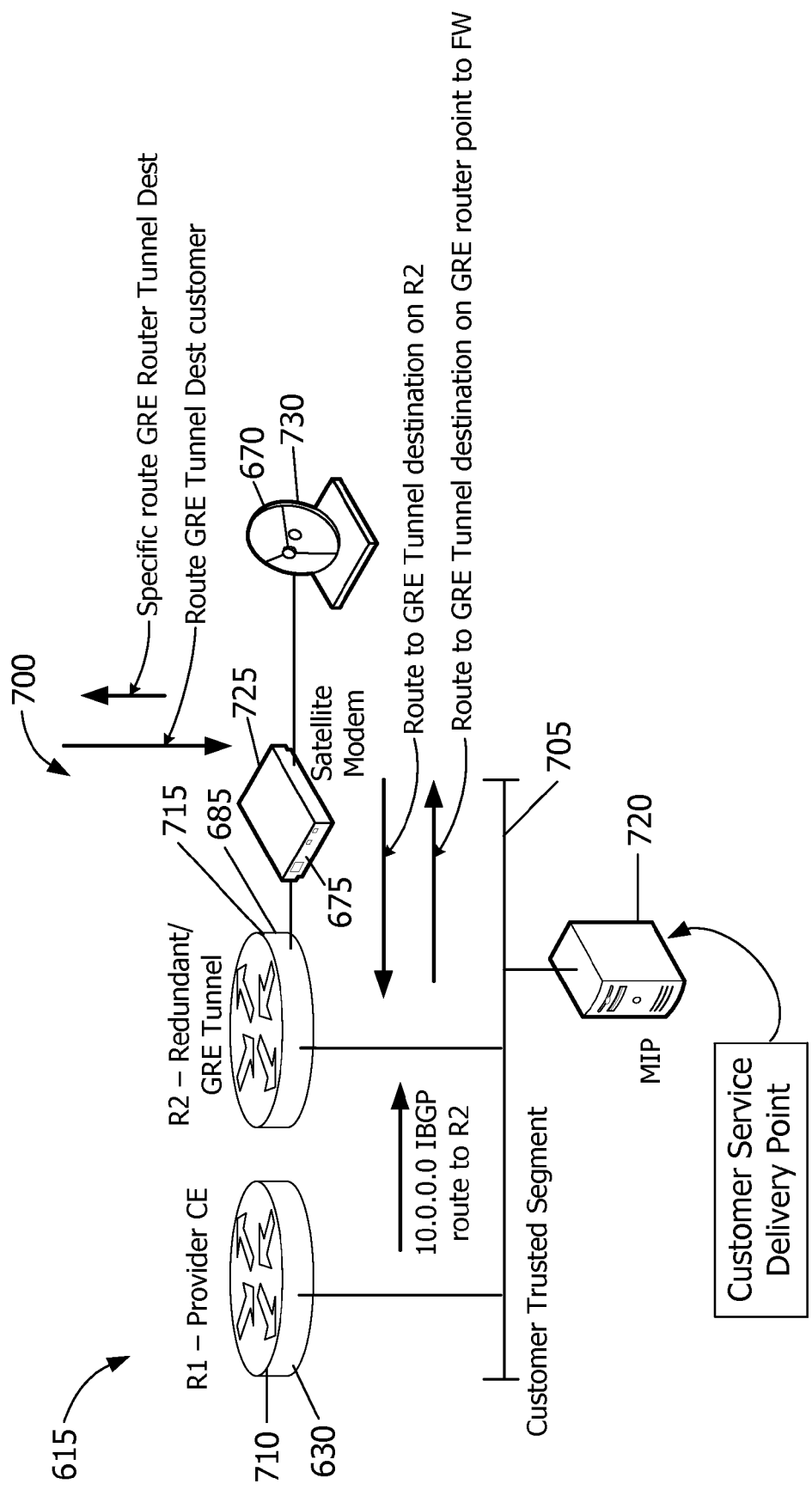

FIGS. 7 and 8 are schematic diagrams of an exemplary customer network 700. Customer network 700 is also referred to as RDT network 700. Customer/RDT network 700 is similar to customer/RDT network 615 shown in FIG. 6. RDT network 700 includes a local area network (LAN) 705 that links a CE router 710 (which may be the same as router 630), a GRE router 715 (which may be the same as router 685), and a communications processor 720. In the exemplary embodiment, communications processor 720 is a MASTERCARD INTERFACE PROCESSOR™ or MIP™ (trademarks of MasterCard International, Inc., of Purchase, N.Y.). GRE router 715 is linked to a satellite modem 725, which may be the same as satellite modem 675. Satellite modem 725 is in communication with second satellite dish 730, which may be the same as second satellite dish 670. Processor 720 is configured to communicate with server system 112 of payment network 28 for processing payment transactions. Processor 720 may be located at and/or utilized by at least one of acquirer bank 26 and issuer bank 30 (shown in FIG. 6).

Figure 9:
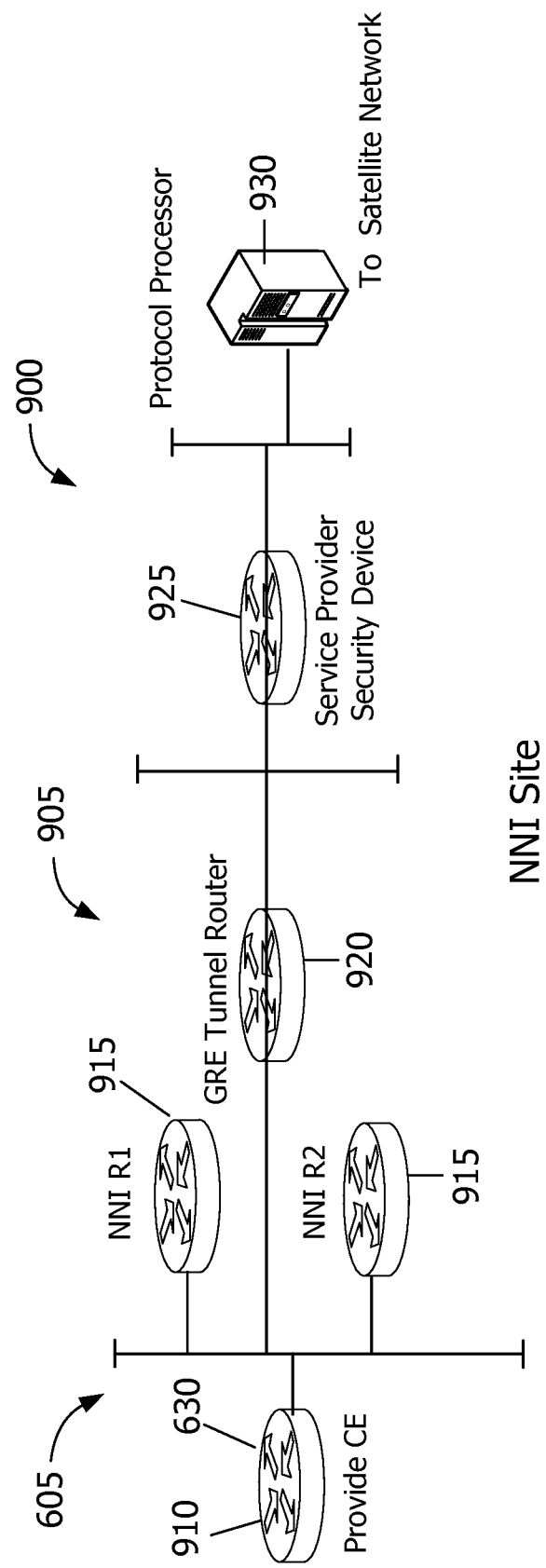
Figure 10:
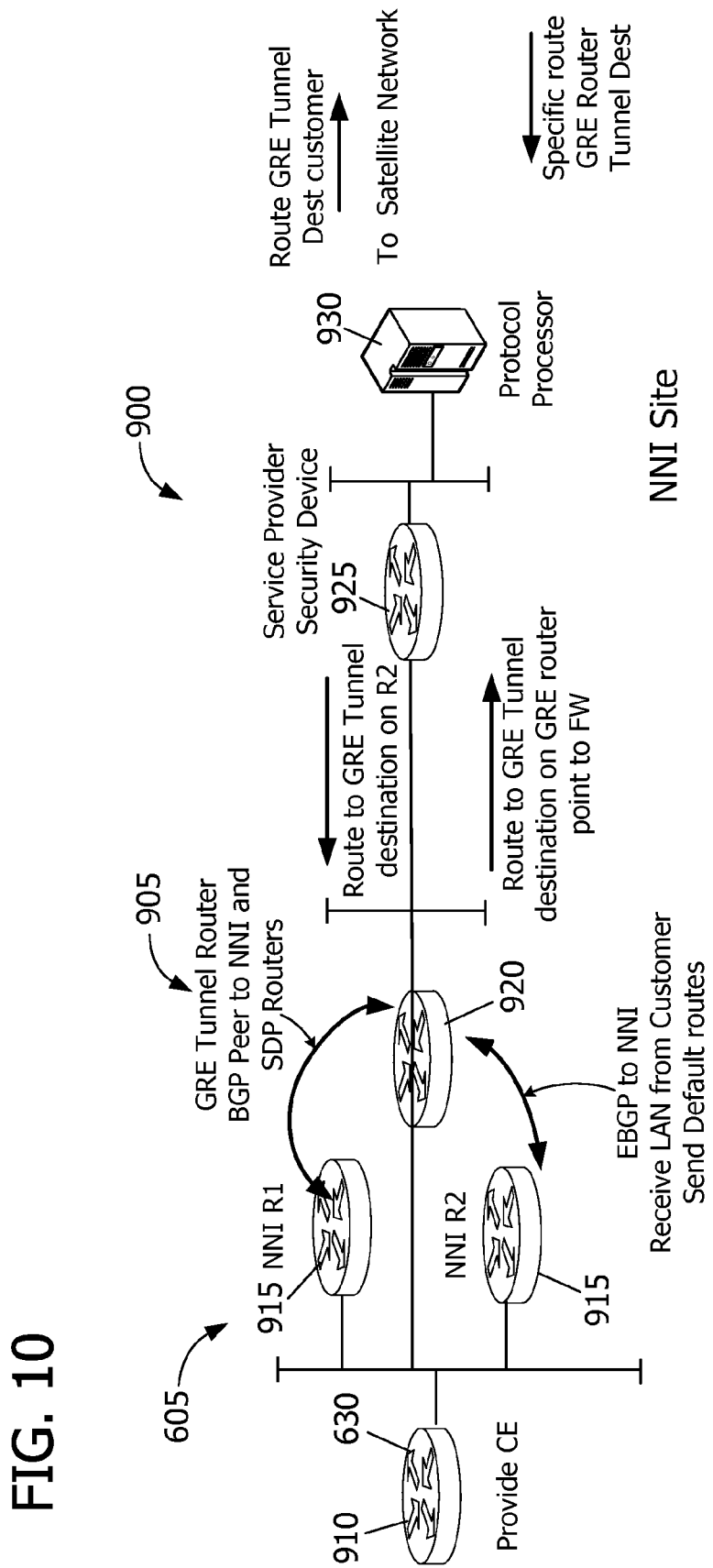

FIGS. 9 and 10 are schematic diagrams of an exemplary NNI 900, which may be the same as NNI 605. NNI 900 includes a LAN 905 that links a CE router 910, at least one router 915, and a GRE router 920. GRE router 920 is linked to a satellite provider security system 925 or router, which may be configured to encrypt or decrypt data transmitted over a satellite network (not shown). Security system 925 is linked to a protocol processor 930 that is linked to the satellite network (not shown). GRE router 920 may be linked to security system 925 via a layer 3 switch (not shown), which may be configured for level 2 access only. GRE router 920 may be linked to switches (not shown) within NNI 900 using at least one virtual LAN (VLAN).

Figure 11:
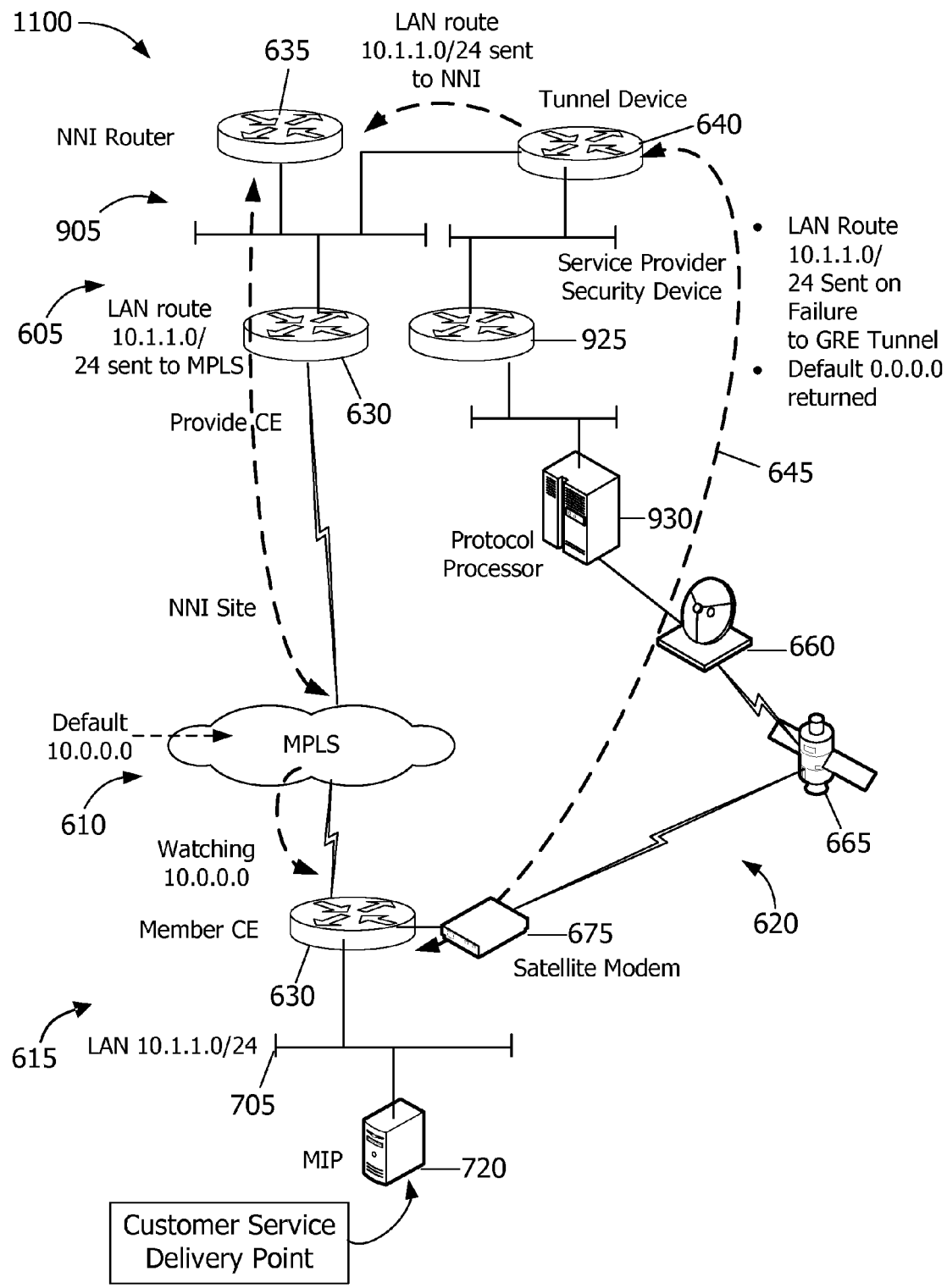

FIG. 11 is a schematic diagram of an example configuration 1100 of communication network 600. In this example, if the connection between CE router 630 on RDT network 615 and MPLS network 610 fails, CE router 630 will "see" the lost route and, using BGP conditional advertisement, announce route(s) to RDT network 615 to GRE tunnel 645 via satellite network 620. The route map may set the community value to a predetermined value, such as AS: 222. The route map may also add a predetermined AS prepend value, such as 22222. GRE router 640 may forward RDT network 615 routes to router(s) 635, and router(s) 635 may, in turn, forward RDT network 615 routes to all CE routers 630 within NNI 605.

Existing VLANs may be used at NNI 605 for access between GRE router 640 and routers 635. A new VLAN may be used for access between security system 925, which may be a router, and GRE router 640. The link between security system 925 and GRE router 640 may use private addressing, i.e., from RFC1918. A loopback may be used as the source for GRE tunnel 645 interface. GRE tunnel 645 interface may use an address in the 10.0.0.0/8 network, and the GRE tunnel 645 source loopback address may be in the 192.168.0.0/16 network. The GRE tunnel 645 source used on RDT network 615 may be allocated from blocks of /24 to permit summarization and simplify routing at NNI 605.

Hot standby router protocol (HSRP) may be used for failover between CE router 630 on RDT network 615 and router 685. However, as shown in FIG. 11, a single router 630 may provide the same functionality as the combination of routers 630 and 685 (i.e., links RDT network 615 to either/both MPLS network 610 and satellite network 620). Multiple LAN links to router 685, in the case of a dual router setup, or to router 630, in the case of a single router setup, provide redundancy for switch failure.

ACL is used in route maps as filters in BGP. ACL may define the watched route for a "non-exist" route-map (which may be defined on router 630), allow advertised routes, and deny routes from GRE router 640. The community string set on GRE tunnel 645 may be used in a BGP route-map to allow RDT network 615 route to routers 635. A route-map for each MPLS network 610 may be required. For example, an outgoing BGP route-map may be used with an ACL to prevent sending any routes over GRE tunnel 645 except for predetermined conditional routes. The BGP statement may be as follows: neighbor 10.100.12.20 advertise-map adver_default non-exist-map watch_route. The non-exist-map is the watched route. The advertise-map is for sending RDT network 615 routes if the primary link is down.

Encryption may be accomplished using DES, AES, or any suitable encryption algorithm using a suitable number of bits, e.g., 256. QoS may be configured on GRE tunnel 645. Accordingly, QoS marking of traffic may be required as data is sent to router 635. The following QoS configurations may be used:

Egress LAN Interface to customer network
service-policy output COUNT-OUT
Egress LAN Interface to satellite modem
service-policy input COUNT-IN
class-map match-any DSCP-OUT-D3
    match ip dscp af11
    match ip dscp af12
class-map match-all DSCP-COUNT-D3OOP
    match ip dscp af12
class-map match-all DSCP-COUNT-D2OOP
    match ip dscp af22
class-map match-all DSCP-COUNT-D1OOP
    match ip dscp af32
class-map match-all DSCP-COUNT-D1INP
    match ip dscp af31
class-map match-all DSCP-COUNT-D2INP
    match ip dscp cs2 af21
class-map match-all DSCP-COUNT-D3INP
    match ip dscp af11
policy-map COUNT-OUT
    class DSCP-COUNT-D1INP
        set ip dscp af31
    class DSCP-COUNT-D1OOP
        set ip dscp af32
    class DSCP-COUNT-D2INP
        set ip dscp af21
    class DSCP-COUNT-D3INP
        set ip dscp default
    class ROUTING-COUNT
        set ip dscp cs6
    class SCAVENGER-COUNT
        set ip dscp cs1
policy-map COUNT-IN
    class DSCP-COUNT-D1INP
        set ip dscp af31
    class DSCP-COUNT-D1OOP
        set ip dscp af32
    class DSCP-COUNT-D2INP
        set ip dscp af21
    class DSCP-COUNT-D3INP
        set ip dscp af11
    class ROUTING-COUNT
        set ip dscp cs6
    class SCAVENGER-COUNT
        set ip dscp cs1

Figure 12:
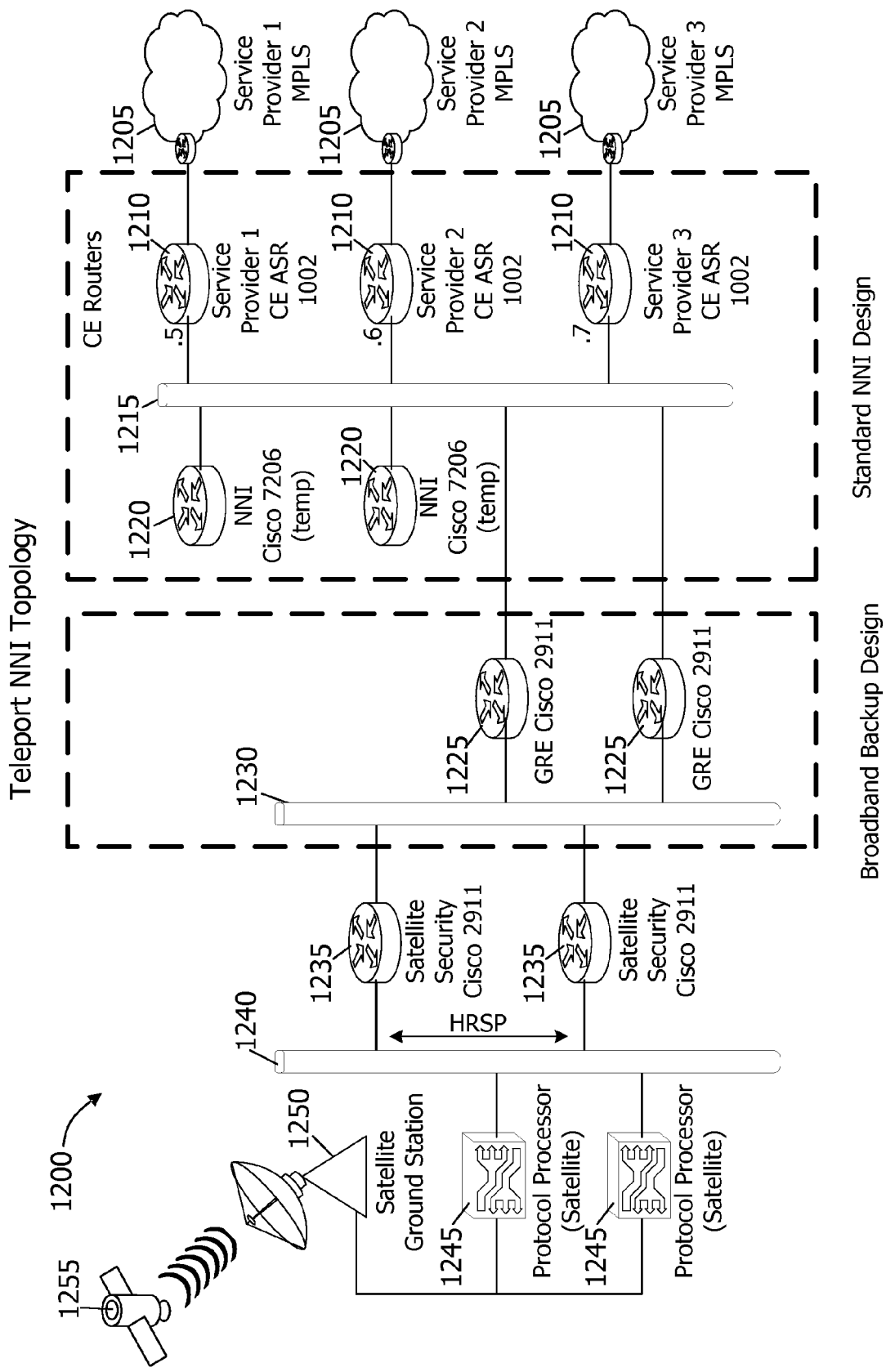

FIG. 12 is an exemplary NNI 1200 that may be used with communication network 600. NNI 1200 may be linked to one or more MPLS networks 1205 via one or more CE routers 1210. A LAN 1215 may link CE routers 1210, at least one router 1220, and at least one GRE router 1225. A LAN 1230 may link GRE routers 1225 to satellite routers 1235. HRSP may be used on a LAN 1240 to provide failover between or among satellite routers 1235. LAN 1240 may link satellite routers 1235 with one or more protocol processors 1245. Protocol processors 1245 are configured to send and receive data to/from a satellite ground station 1250 and to/from LAN 1240 and/or routers 1235. Satellite ground station 1250 is configured to communicate with satellite 1255. While a specific number of routers, LANs, MPLS networks, and other components are shown in FIG. 12, it is contemplated that any number of such components may be used in accordance with the present invention.

Routers 1220 may be configured to forward traffic from any CE router 1210 to any other CE router 1210. In other words, NNI 1200 is capable of effectively bridging more than one MPLS network. NNI 1200 may also be capable of forwarding traffic from any GRE router 1225 to any MPLS network 1205, and vice versa. It should be appreciated that any endpoint or system within NNI 1200 may be configured to communicate with any other endpoint or system within NNI 1200.

Alternatively, NNI 1200 may be configured to communicate with customer networks via the Internet. For example, rather than linking GRE routers 1225 and/or LAN 1230 to satellite routers 1235, GRE routers 1225 and/or LAN 1230 may be linked to Internet routers (not shown) that are configured to communicate with the Internet. Accordingly, GRE routers 1225 may create GRE tunnels (not shown) with customer networks via the Internet using the same principles described herein.

Figure 13:
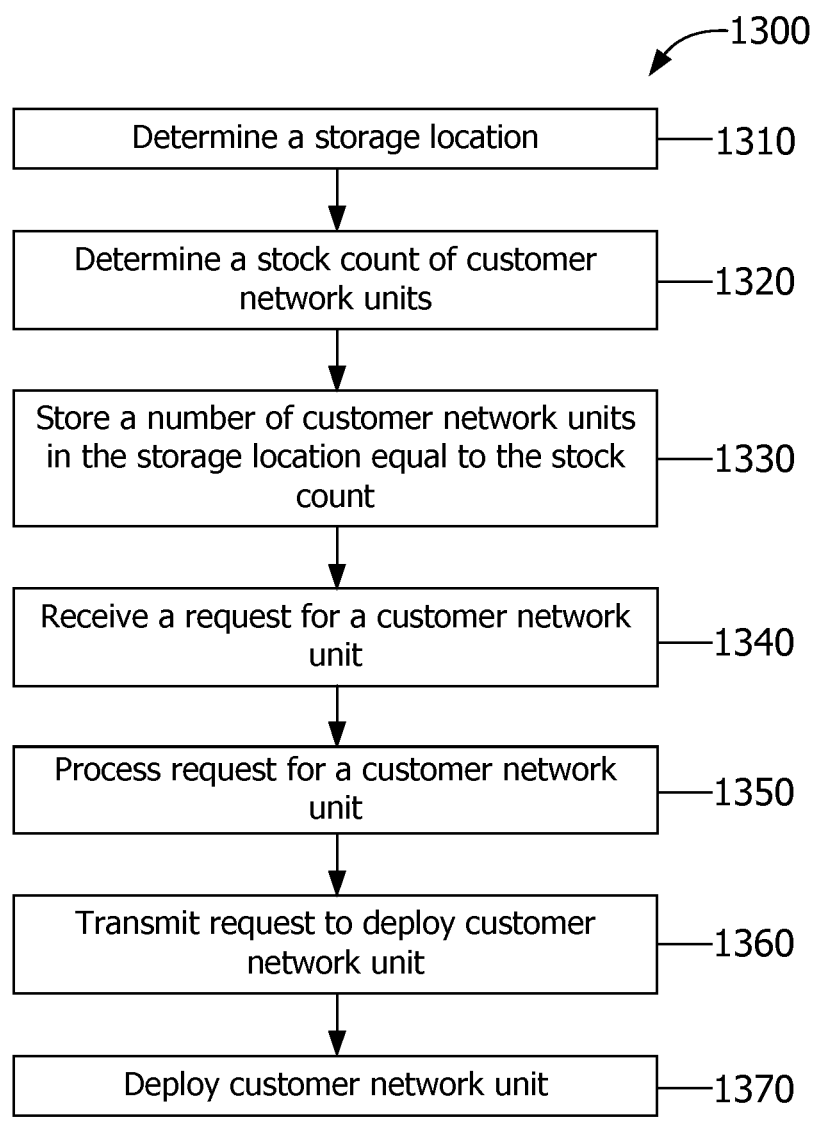

FIG. 13 is a flow diagram of a method 1300 for deploying communication network 600 having RDT network 615 included therewith. RDT network 615 is typically deployed in a geographic location that is considered a new or an emerging market for using transaction cards to perform payment transactions. These geographic locations typically lack the terrestrial network communication links needed to process these payment-by-card type transactions. Thus, RDT network 615 includes both a terrestrial network segment (e.g., frame relay, ISDN, Ethernet, etc.) and a satellite network segment.

In the example embodiment, the satellite network segment portion of RDT network 615 is able to be deployed more quickly than the terrestrial network segment portion of RDT network 615. Accordingly, as explained below, when RDT network 615 is deployed, the satellite network segment portion of RDT network 615 is configured as the primary communication link with the payment network until the terrestrial network segment portion of RDT network 615 is installed and configured to use. Once the terrestrial network segment portion of RDT network 615 is installed and ready for use, the terrestrial network segment portion of RDT network 615 is configured as the primary communication link with the payment network, and the satellite network segment portion of RDT network 615 is reconfigured as the secondary (or backup) communication link with the payment network.

Installation of terrestrial network segments may take ninety days or more to install on a customer's premises. However, in the case of the process described herein, the satellite link portion of the RDT network 615 may be established at a customer's premises in a shorter period of time. For example, the satellite link portion of the RDT network 615 may be established at a customer's premises in 30 days or less from receiving the request from the customer to connect the customer to the payment network. By installing the satellite link first, the customer is able to connect to the network sooner than if the customer were to wait for the terrestrial network link to be installed (e.g., 60 or more days sooner). To facilitate rapid deployment of satellite links, a sufficient number of customer network units may be stored in predetermined locations that are proximate to where customer and potential customer premises exist. A customer network unit may include, but is not limited to, the components shown in FIGS. 7 and 8, such as a CE router, a GRE router, LAN equipment (e.g., switches, cabling, racks, etc.), a communications processor (i.e., a MIP™), a satellite modem, and a satellite ground station or dish. In other words, a customer network unit includes the components necessary to install a communications processor at the customer premises and link the communications processor to the payment card interchange network via a satellite.

In the example embodiment, RDT network 615 is configured to improve the timeline needed for ordering and installing the telecommunication network. The process for deploying RDT network 615 includes pre-bundling of network and satellite devices into RDT network kits, and pre-storing the RDT network kits in warehouses in strategic locations so that the kits are ready for immediate deployment to connect to the payment network. Thus, the RDT network kits include (1) components for configuring a satellite connection to the payment network as described herein, and (2) the components for connecting the customer to a standard terrestrial circuit, which is typically installed several weeks after the satellite link is installed and used.

More specifically, the RDT network kits include at least one of the following items: (1) Payment Network Interface Processor Equipment: server cabinet, 2 interface processor servers, 1 monitor kit, 1 KVM switch, CDs, cables and power cords; (2) Communication Equipment: 2 network routers, 2 network switches, cables and power cords; (3) VSAT Equipment: C-Band configuration: antenna, mount, block upconverter, low noise block converter, TDMA modem, installation kit, uninterruptable power supply and battery pack; (4) VSAT Spare Equipment: TDMA modem, block upconverter, low noise block converter; and (5) Links: MPLS link (terrestrial), and VSAT link (satellite).

Method 1300 includes determining 1310, using a computer system such as system 100 (shown in FIG. 2), a storage location for the RDT network kits. The storage location may be determined based on one or more factors, including, but not limited to, existing storage facilities, locations of existing customers, locations of potential customers, the identification of areas likely to experience near-term growth of payment card usage, the identification of areas lacking in terrestrial communication networks, storage facility costs, locations of transportation hubs and routes, and the like.

A stock count of RDT network kits to be stored in the determined storage location is determined 1320 using the computer system. For example, based on historical demand, known short-term demand, and/or forecasted demand, the computer system may determine a stock count of RDT network kits likely to be needed within a time window, e.g., 90 days. The stock count may be output or otherwise transmitted to other computer systems capable of ordering or facilitating the arrangement and delivery of the RDT network kits to the determined storage location. For example, the computer system may notify the operator of the interchange network of the stock count that is required in each determined storage location. A number of RDT network kits, equal to the determined stock count, are stored 1330 in the determined storage location. RDT network kits are stored such that each unit may be rapidly deployed. For example, each unit may be assembled into a single container that is configured to be transported to a customer location.

A request for an RDT network kit is received 1340 by the computer system. This would occur, for example, when an acquirer bank enrolls with the interchange network for processing financial transactions over the payment card network. In this example, the RDT network kit would then need to be installed at the acquirer bank site so that these financial transactions could be transmitted and processed over the interchange network. The request may contain the name, address, and contact information of the customer (i.e., the acquirer bank). The request may also contain installation instructions. The request is processed 1350 by the computer system before transmitting 1360 a request to deploy the RDT network kit. The request for deployment may be transmitted to the storage location of the RDT network kit. The RDT network kit is deployed 1370 to the customer's (acquirer bank) premises by transporting the unit to the premises and installing the unit.

In another example, the RDT network kit is deployed to an issuer bank, which can also be a customer of the payment network. This would occur, for example, when the issuer bank enrolls with the interchange network for processing financial transactions over the payment card network. In this example, the RDT network kit would then need to be installed at the issuer bank site so that these financial transactions could be transmitted and processed over the interchange network. The request may contain the name, address, and contact information of the customer (i.e., the issuer bank). The request may also contain installation instructions. The request is processed 1350 by the computer system before transmitting 1360 a request to deploy the RDT network kit. The request for deployment may be transmitted to the storage location of the RDT network kit. The RDT network kit is deployed 1370 to the customer's (issuer bank) premises by transporting the unit to the premises and installing the unit.

In response to the unit deployment, and/or the request for a unit, the computer system may determine a new stock count of RDT network kits that is different than a previous stock count. Alternatively, the computer system may generate a notification that a replacement network kit is needed to replenish the kits at the storage location. For example, the computer system may determine, based on the kit deployment and/or the request for a kit, that additional kits will be needed to satisfy a forecasted demand for kits. More particularly, the computer system may determine that based on the rate of requests for RDT network kits, the stock count should be increased in order to satisfy future demand.

Figure 14:
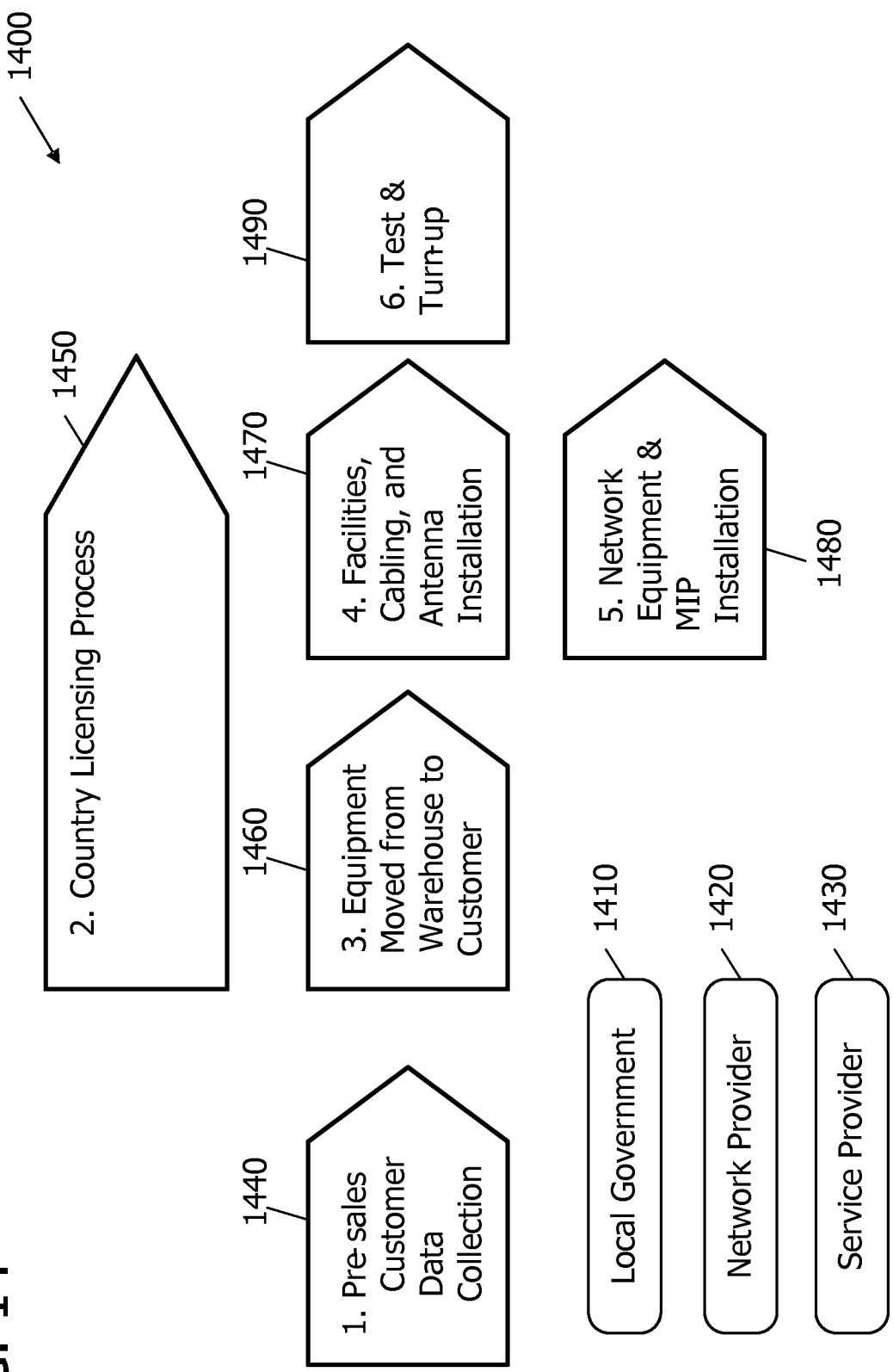

FIG. 14 is a flow diagram 1400 of a method for deploying RDT network 615 using an RDT network kit as described herein. As shown, diagram 1400 includes the steps taken by three parties typically involved in the deployment of RDT network 615, namely: a local government 1410, a payment network provider 1420 (such as an interchange network provider), and a service provider 1430 (such as a satellite service provider). Payment network provider 1420 collects 1440 customer information, such as the information received 1340 in a request for an RDT network kit. During the process of collecting this customer information, a customer satellite data collection packet is completed. The data packet will contain all of the data needed to obtain a satellite license as well as the information needed for a typical installation of RDT network 615.

Either payment network provider 1420 or service provider 1430 initiates 1450 the process for receiving necessary licenses from local government 1410 to operate a satellite link within the jurisdiction of local government 1410.

Substantially simultaneously, service provider 1430 transports 1460 a RDT network kit to the customer (e.g., typically an acquirer bank or an issuer bank). Service provider 1430 prepares 1470 the facilities, cabling, and/or antennas/dishes at the customer premises, and payment network provider 1420 installs 1480 networking and computer equipment, such as the LAN, routers, and the communications processor (i.e., the MIP™). Payment network provider 1420 tests 1490 the installed customer network unit and initiates the operation of the customer network unit with the satellite link when local government 1410 issues the necessary license(s), if applicable.

The term customer, as used herein, may refer to merchant 24, merchant bank 26, issuer 30, and/or any other party that needs to be connected to the payment network through a communications processor, such as a MIP. Without limiting the generality of the foregoing, it is contemplated that the typical customer will be at least one of merchant bank 26 also referred to as the acquirer bank, and issuer bank 30. The term "SDP" refers to a "service delivery point" and may be used to refer to the customer receiving the service being provided from the RDT network.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is determining a storage location, determining a stock count, receiving a request for a customer network unit, processing the request, generating and transmitting a request for deployment of the customer unit, and adjusting the stock count in the storage location. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The above-described embodiments of a method and system of expanding a network provide a cost-effective and reliable means for deploying customer network units for use with a satellite link. As a result, the methods and systems described herein facilitate rapid connection of customers to existing networks.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-implemented method for extending a payment network via a rapidly deployable telecommunications (RDT) network, the method implemented using a computer device coupled to a memory device, the method comprising:
   receiving a plurality of network demand information associated with a geographic region having limited terrestrial connectivity to a payment network;
   determining a network kit demand level for the geographic region based on the network demand information;
   determining a number of network kits to be stored based on the network kit demand level;
   identifying, using the computer device, a storage location for storing the number of network kits, wherein each of the number of network kits is configured to deploy at least a portion of an RDT network, wherein the storage location is within the geographic region;
   requesting the number of network kits to be stored at the storage location;
   receiving a deployment request to deploy one of the number of network kits from the storage location to a customer;
   deploying the one of the number of network kits for the customer, wherein deploying the one of the number of network kits represents communicatively coupling the customer to the payment network via the one of the number of network kits using a first plurality of networking components to rapidly create a satellite communication link that communicatively couples the customer to the payment network; and
   processing a first payment transaction from the customer over the payment network, using the one of the number of network kits and the RDT network.

2. A computer-implemented method in accordance with claim 1, further comprising:
   receiving, at the computer device, the deployment request to deploy one of the number of network kits, wherein the deployment request includes customer information identifying the customer receiving the one of the number of network kits, and wherein the customer is a customer of the payment network including at least one of an acquirer bank and an issuer bank.

3. A computer-implemented method in accordance with claim 2, wherein customer information further comprises customer contact data, and site data including data required to obtain a satellite license and install the RDT network.

4. A computer-implemented method in accordance with claim 1, further wherein deploying the one of the number of network kits to the customer comprises deploying the one of the number of network kits to communicate with an RDT network, the one of the number of network kits network kit including at least one of the following packages: (i) payment network interface processor package including server cabinet, at least one interface processor server, a monitor kit, a KVM switch, cables and power cords; (ii) communication equipment package including at least one router, at least one layer 2 Ethernet switch, cables and power cords; (iii) VSAT equipment package having a C-band configuration including antenna, mount, block upconverter, low noise block converter, TDMA modem, installation kit, uninterruptable power supply and battery pack; (iv) VSAT spare equipment package including a TDMA modem, block upconverter, low noise block converter; and (v) link package including a MPLS link and VSAT link.

5. A computer-implemented method in accordance with claim 1, further comprising:
   transporting the network kit to a site location associated with a customer of the payment network; and
   using the network kit to install the RDT network linking the customer site location to the payment network.

6. A computer-implemented method in accordance with claim 1, further comprising:
   using a second plurality of networking components of the one of the number of network kits to switch to connect the customer to a terrestrial communication link once the terrestrial communication link is available,
   wherein the payment network is an interchange network configured to process payment transactions involving payment cards,
   wherein the satellite communication link functions as a primary link for the customer when processing payment card transactions until the terrestrial communication link is available, and
   wherein the satellite communication link functions as a secondary link for the customer when processing payment card transactions after the terrestrial communication link is available.

7. A computer-implemented method in accordance with claim 6, wherein the one of the number of network kits and the storage location are configured to enable full deployment of the satellite communication link portion of the RDT network within than thirty days of receiving the deployment request, wherein full deployment includes linking the customer to the payment network for processing payment transactions involving payment cards.

8. A computer-implemented method in accordance with claim 1, wherein identifying a storage location for the number of network kits further comprises determining the storage location for the number of network kits based on at least one of a number of existing storage facilities within an area of interest, locations of existing customers within the area of interest, locations of potential customers within the area of interest, identification of areas likely to experience near-term growth of payment card usage, identification of areas lacking in terrestrial communication networks, storage facility costs within the area of interest, and locations of transportation hubs and routes.

* * * * *